UNITED STATES PATENT OFFICE.

BERTRAM MAYER AND LEOPOLD WEIL, OF BASEL, SWITZERLAND, ASSIGNORS TO SOCIETY OF CHEMICAL INDUSTRY IN BASLE, OF BASEL, SWITZERLAND.

PROCESS FOR THE MANUFACTURE OF A SULFURETED VAT DYE OF THE ANTHRACENE SERIES.

1,044,797.    Specification of Letters Patent.    Patented Nov. 19, 1912.

No Drawing.    Application filed August 3, 1911. Serial No. 642,134.

*To all whom it may concern:*

Be it known that we, BERTRAM MAYER, doctor of philosophy and chemist, a subject of the King of Bavaria, and LEOPOLD WEIL, doctor of philosophy and chemist, a subject of the Grand Duke of Baden, residents of Basel, Switzerland, have invented a new Process for the Manufacture of a Sulfureted Vat Dye of the Anthracene Series, of which the following is a full, clear, and exact specification.

In the United States Letters Patent 927,868 is described a blue-green dyestuff obtained by heating methylbenzanthrone melting at 199° C. with sulfur to 200–240° C. The same blue-green vat dyestuff, but dyeing considerably clearer tints and being in a purer crystalline form is obtained, when the sulfuration is effected in the presence of a diluent, as for instance naphthalene, in a reflux apparatus. The resulting crystallized sulfurized dyestuff corresponds probably to the formula:

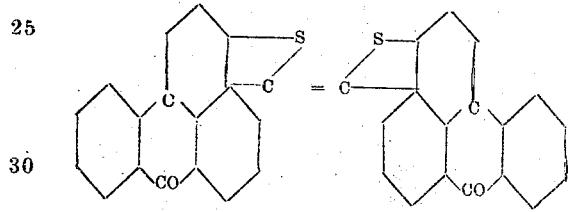

The following example illustrates the invention:

Example I: 20 parts of methylbenzanthrone (melting point 199° C.) are heated together with 20 parts of sulfur and 100 parts of naphthalene for 25 hours in a reflux apparatus, the mixture being kept boiling. The still warm liquid mass is filtered and the solid matter is washed with hot xylene, whereby the dyestuff is left in a satisfactory pure condition in the form of small crystals showing after trituration a vivid coppery luster. It dissolves in concentrated sulfuric acid with a brown-violet coloration and is insoluble in glacial acetic acid, alcohol and toluene. In boiling nitrobenzene or boiling chloronaphthalene it dissolves only in small quantities giving a blue solution having a moss-green fluorescence. With caustic soda lye and hydrosulfite the dyestuff yields a violet-blue vat which dyes cotton pure blue tints passing after exposure to air and soaping to a pure, intense, blue-green of excellent fastness. The same dyestuff is obtained, when in the foregoing example the methylbenzanthrone is replaced by its specified nitro- or halogen derivatives.

What we claim is:

1. The described process for the manufacture of new sulfureted vat dyestuffs of the anthracene series, which consists in heating a methylbenzanthrone compound with sulfur to a high temperature, in presence of a diluent.

2. The described process for the manufacture of a new sulfureted vat dyestuff of the anthracene series, which consists in heating methylbenzanthrone melting at 199° C. with sulfur to a high temperature in presence of a diluent.

3. The described process for the manufacture of a new sulfureted vat dyestuff of the anthracene series, which consists in heating methylbenzanthrone melting at 199° C. with sulfur to a high temperature in presence of naphthalene.

In witness whereof we have hereunto signed our names this 25th day of July 1911, in the presence of two subscribing witnesses.

BERTRAM MAYER.
LEOPOLD WEIL.

Witnesses:
  GEORGE GIFFORD,
  HANS TREFZGER.